United States Patent [19]
Gebelein, Jr.

[11] 3,857,081
[45] Dec. 24, 1974

[54] PROPORTIONAL SOLENOID ACTUATOR

[75] Inventor: Edward F. Gebelein, Jr., Harwinton, Conn.

[73] Assignee: Chandler Evans Inc., West Hartford, Conn.

[22] Filed: June 25, 1973

[21] Appl. No.: 373,001

[52] U.S. Cl. ................. 318/687, 318/676, 318/118, 317/143, 335/215
[51] Int. Cl. ........................................... G05b 11/00
[58] Field of Search ........... 318/676, 653, 687, 118; 332/38 R; 324/45; 317/123, 143; 335/215

[56] References Cited
UNITED STATES PATENTS

| | | | |
|---|---|---|---|
| 2,780,101 | 2/1957 | Kinkel | 318/676 X |
| 2,814,768 | 11/1957 | Kinkel | 318/676 |
| 3,080,507 | 3/1963 | Wickerham et al. | 317/123 |
| 3,660,695 | 5/1972 | Schmitt | 338/32 R |
| 3,752,189 | 8/1973 | Marr et al. | 318/676 UX |

*Primary Examiner*—B. Dobeck

[57] ABSTRACT

A solenoid device which provides an output force proportional to input signal amplitude regardless of the position of the solenoid plunger is disclosed. A flux measuring device is located in the magnetic circuit of the solenoid and provides a signal proportional to flux density. This flux density proportional signal is employed for control purposes to vary the solenoid coil excitation as a function of the input signal and the desired output force.

3 Claims, 1 Drawing Figure

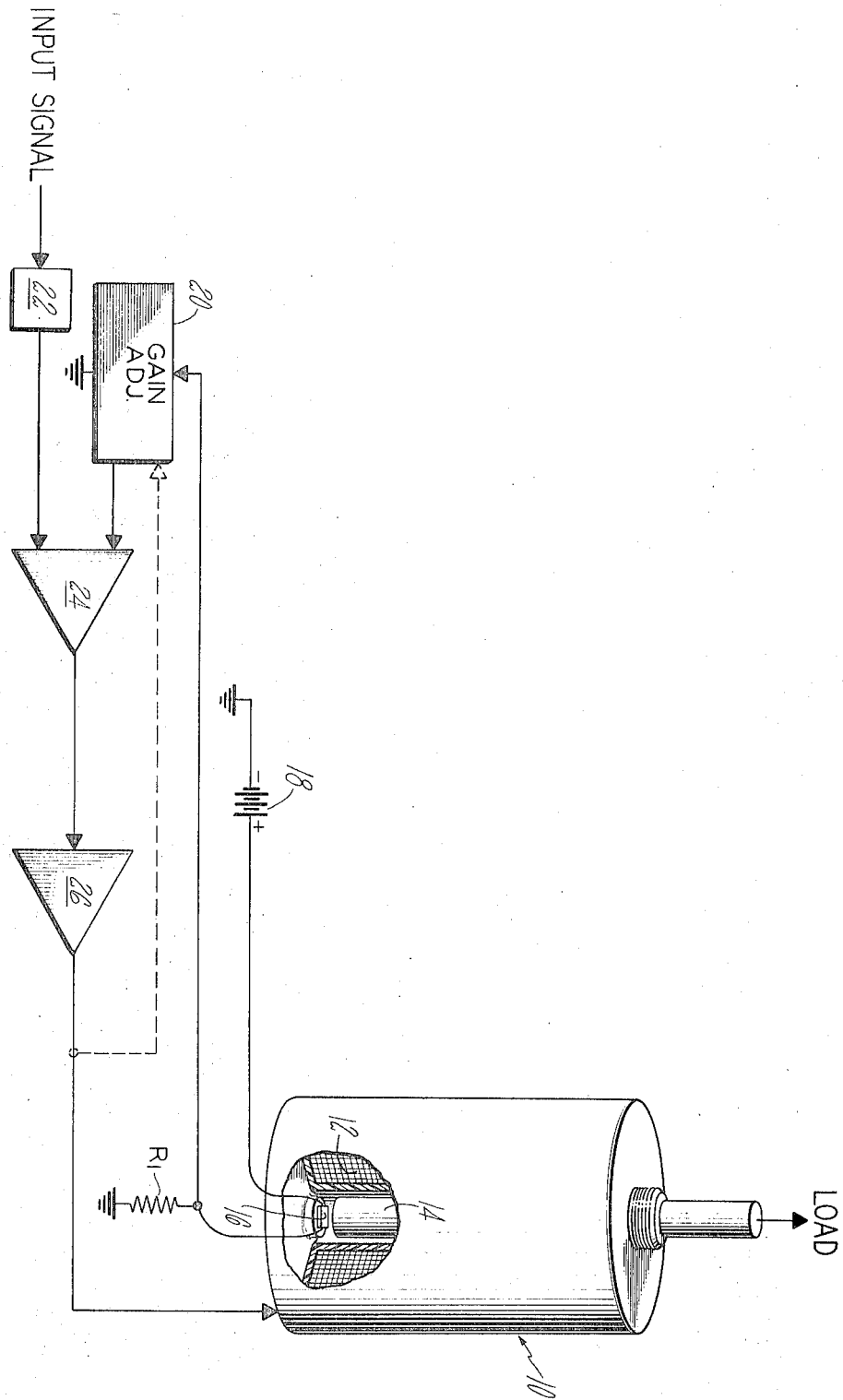

PROPORTIONAL SOLENOID ACTUATOR

BACKGROUND OF THE INVENTION

1. Field of the Invention

The present invention relates to controlling the force produced by an electro-magnetic actuator. More specifically, the present invention is directed to a proportional solenoid system wherein the solenoid coil excitation is varied in such a manner as to provide a controllable flux density regardless of the position of the moving member of the solenoid. Accordingly, the general objects of the present invention are to provide novel and improved methods and apparatus of such character.

2. Description of the Prior Art

As is well known, magnetic devices such as solenoids are inherently unstable due to their characteristically predominant negative "spring rate". This negative "spring rate" results from a lowering of the reluctance of the magnetic path of the solenoid as the gap between the solenoid plunger and the position commensurate with its innermost limit of movement closes. The negative "spring rate" problem may be reduced, by conventional methods which sacrifice stroke and/or sensitivity, by making the air gap large with respect to the stroke of the plunger. However, it has previously been impossible to generate a force proportional to excitation current by means of a solenoid mechanism.

In view of the problem briefly described in the immediately preceding paragraph, when it has in the prior art been desired to position a load or generate a force proportional to excitation current, resort has been had to the use of devices such as torque motors. While torque motors have provided generally acceptable results, these results, when compared to the potential utilization of solenoid type mechanisms, have been obtained at the sacrifice of size, weight and expense.

SUMMARY OF THE INVENTION

The present invention overcomes the above briefly discussed and other deficiencies and disadvantages of the prior art by providing means whereby the excitation of a solenoid coil may be varied in such a manner as to provide a controllable flux density. The present invention comprises means for generating a feedback signal proportional to solenoid flux density; the feedback signal thus being a function of force. This feedback signal, after gain compensation, is summed with an input force command. The results of the comparison are employed to adjust the solenoid excitation current so as to cause the generation or maintenance of the desired output force.

BRIEF DESCRIPTION OF THE DRAWING

The present invention may be better understood and its numerous objects and advantages will become apparent by reference to the accompanying drawing which is an electrical block diagram of a preferred embodiment of the invention.

DESCRIPTION OF THE PREFERRED EMBODIMENT

With reference to the drawing, a solenoid assembly is indicated generally at 10. The solenoid assembly includes a coil 12 and, disposed in the air gap, a movable plunger 14 comprised of magnetic material. Plunger 14 includes an extension which will be mechanically coupled to a movable load; the load typically being constant and biasing the plunger toward the position of maximum air gap.

A transducer 16 responsive to the magnetic flux density is positioned in the magnetic circuit of solenoid 10. As depicted in the drawing, the transducer 16 is located in the active air gap of the solenoid. Transducer 16 will be a non-contacting type sensor device which exhibits a resistance which is a function of local magnetic flux density B. The class of field responsive devices known in the art as magnetoresistors (MRs) are particularly well suited for use in the present invention. A magnetoresistor is a solid-state device comprised of indium antimonide which does not have to be biased for proper operation.

In the disclosed embodiment of the invention the transducer 16 is connected in a voltage divider circuit with a suitable constant voltage source, indicated schematically as battery 18, and a resistor R1. The voltage at the junction of resistor R1 and the transducer 16 will, of course, vary with the resistance of the magnetoresistor. This voltage is applied as an input to a compensation circuit 20. The resistance of a magnetoresistor increases when a perpendicular magnetic field is applied and MRs have a square-law response to fields up to 3-kG. Magnetoresistors can be obtained commercially which exhibit a substantially linear ratio of resistance to zero-field resistance in the range of 3-kG to 100-kG. Thus, with the MR transducer 16 mounted in the air gap of solenoid 10 as shown, the input to compensation circuit 20 will be a signal which varies inversely with the local flux density. In accordance with the invention it is possible to operate only in the linear response region of the magnetoresistor. Operation in the square-law response region of the transducer is, however, also possible through use of suitable circuitry in compensation circuit 20 to adjust for the non-linearity of the transducer.

It is well known that the force generated by a solenoid is proportional to the square of the flux density for a given gap area. Accordingly, in the case of a constant load, should it be desired to have the solenoid output force follow an input command signal, the compensation circuit 20 will serve primarily as a gain adjustment. Compensation circuit 20 may comprise a lead circuit and, if necessary or desirable, a non-linear function generator which provides both dynamic and linearity compensation. Such compensation networks are well known in the art. In the embodiment being described compensation circuit 20 will provide an output signal commensurate with measured flux which, as noted, bears a square root relationship to force.

While the output signal from the compensation circuit 20 may be operated upon to provide an output directly proportional to force, in the disclosed embodiment the input force command signal is applied to a squaring circuit 22 to produce an input signal proportional to the flux density commensurate with the desired force. The output of squaring circuit 22 and the output of the compensation circuit 20 are summed in operational amplifier 24. Amplifier 24 will thus function as a comparator to provide an output signal commensurate with any deviations between commanded and actual flux density; the output of amplifier 24 thus varying in accordance with the square of any force error. The output of amplifier 24 is employed to control the gain of a solenoid driver amplifier 26 which provides excitation current to coil 12. The current source for amplifier 26 has been omitted from the drawing in the interest of clarity.

As discussed above, should it be desired to generate an input signal to driver amplifier 26 which varies linearly with any force error, the squaring circuit 22 will be omitted and the compensation circuit 22 will be employed to adjust for any non-linear characteristics of the transducer 16.

The above described embodiment of the invention will inherently compensate for the effects of the load on plunger 14. Should it be deemed necessary or desirable to control solenoid plunger position as a function of an input position command signal and without regard to load, or should a non-uniform load be applied to the plunger, a signal commensurate with excitation current may be fed back to compensation circuit 20 as indicated by the dashed line on the drawing. With the flux density and excitation current known, and with a fixed known geometry of the solenoid, the air gap may be computed. Such compensation may be performed in circuit 20 and may be based upon experimental results. By means of the computation of air gap the device may be caused to function as a servo loop on the gap.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A solenoid actuator system comprising:
a solenoid, said solenoid having a coil defining an air gap and a plunger movable in said air gap in response to the magnetic field generated as a result of the passage of excitation current through said coil, said plunger being coupled to a load and generating a system output force;
non-contacting transducer means positioned in said solenoid air gap, said transducer means including a magnetoresistor for generating an output signal which is a function of solenoid flux density;
comparator means connected to said transducer means and responsive to the flux density signal provided thereby, said comparator means also being responsive to an input signal commensurate with a desired system output force, said comparator means generating an output signal commensurate with the differences between actual solenoid air gap flux density and the flux density which corresponds to the desired plunger output force; and
means responsive to the output signal generated by said comparator means for varying the excitation current delivered to said solenoid coil in accordance with the difference between the actual and desired system output force.

2. The apparatus of claim 1 wherein said comparator means comprises:
means connected to said magnetoresistor for providing an output signal commensurate with changes in resistance;
compensation circuit means responsive to said signal commensurate with changes in resistance for providing an output signal commensurate with flux density as sensed by said magnetoresistor;
means responsive to an input signal commensurate with desired plunger output force for generating a signal commensurate with solenoid flux density corresponding to said desired force; and
amplifier means for receiving and comparing said actual and desired flux density signals and for providing an output signal commensurate with differences therebetween.

3. The apparatus of claim 1 wherein said comparator means comprises:
means connected to said magnetoresistor for providing an output signal commensurate with changes in resistance;
compensation circuit means responsive to said signal commensurate with changes in resistance for providing an output signal commensurate with the force being generated by said solenoid plunger; and amplifier means responsive to an input signal commensurate with desired plunger output force and to the signal generated by said compensation circuit means for generating an output signal commensurate with differences between actual and desired solenoid output force.

* * * * *